(12) United States Patent
Liao

(10) Patent No.: US 6,994,289 B2
(45) Date of Patent: Feb. 7, 2006

(54) REEL ROTATION MOUNT ARRANGEMENT EQUIPPED WITH FRICTION REDUCTION MEANS FOR TAPE MEASURE

(76) Inventor: Huei-Yen Liao, No. 14, Lane 83, Hua-Cheng Road, Hsin-Chuang City (TW)

( * ) Notice: Subject to any disclaimer, the term of this patent is extended or adjusted under 35 U.S.C. 154(b) by 0 days.

(21) Appl. No.: 10/754,400

(22) Filed: Jan. 9, 2004

(65) Prior Publication Data

US 2004/0140386 A1    Jul. 22, 2004

Related U.S. Application Data

(62) Division of application No. 10/302,176, filed on Nov. 21, 2002, now Pat. No. 6,751,883.

(51) Int. Cl.
*G01B 3/10* (2006.01)

(52) U.S. Cl. ............ 242/376.1; 242/379; 33/761; 33/769

(58) Field of Classification Search ........... 242/376.1, 242/379, 376; 33/755, 761, 769
See application file for complete search history.

(56) References Cited

U.S. PATENT DOCUMENTS

| | | | | |
|---|---|---|---|---|
| 3,774,308 A | * | 11/1973 | Jurentkuff | 33/493 |
| 4,756,087 A | * | 7/1988 | Sing | 33/765 |
| 5,490,805 A | * | 2/1996 | Bredesen | 441/75 |
| 6,718,649 B1 | * | 4/2004 | Critelli et al. | 33/761 |
| 6,751,883 B2 | * | 6/2004 | Liao | 33/755 |

* cited by examiner

*Primary Examiner*—Kathy Matecki
*Assistant Examiner*—Sang Kim
(74) *Attorney, Agent, or Firm*—Raymond Y. Chan; David and Raymond

(57) ABSTRACT

A tape measure is constructed to enhance a rotational movement of the tape reel with respect to the supporting axle which has two ends supported at the sidewalls of a casing respectively. The tape reel is rotatably supported by the supporting axle and the elongated measuring blade has an outer end being blocked at the opening of the casing, wherein a friction reduction device is provided between the supporting axle and the tape reel for substantially reducing a friction therebetween.

3 Claims, 6 Drawing Sheets

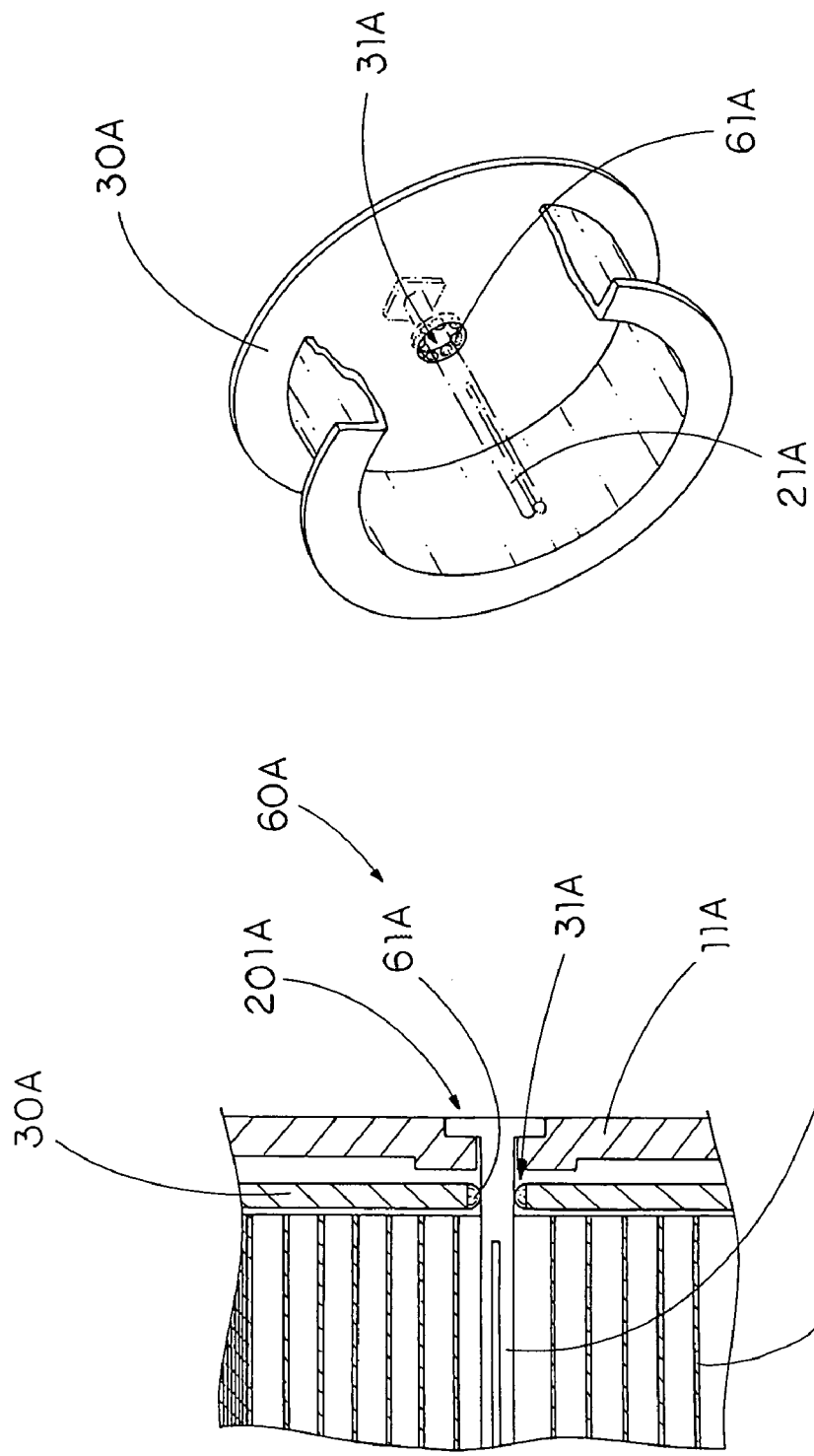

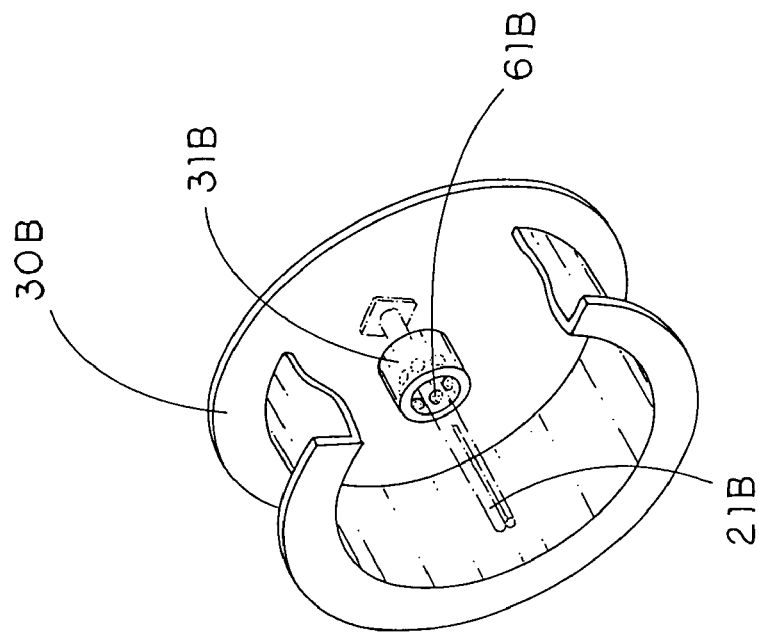
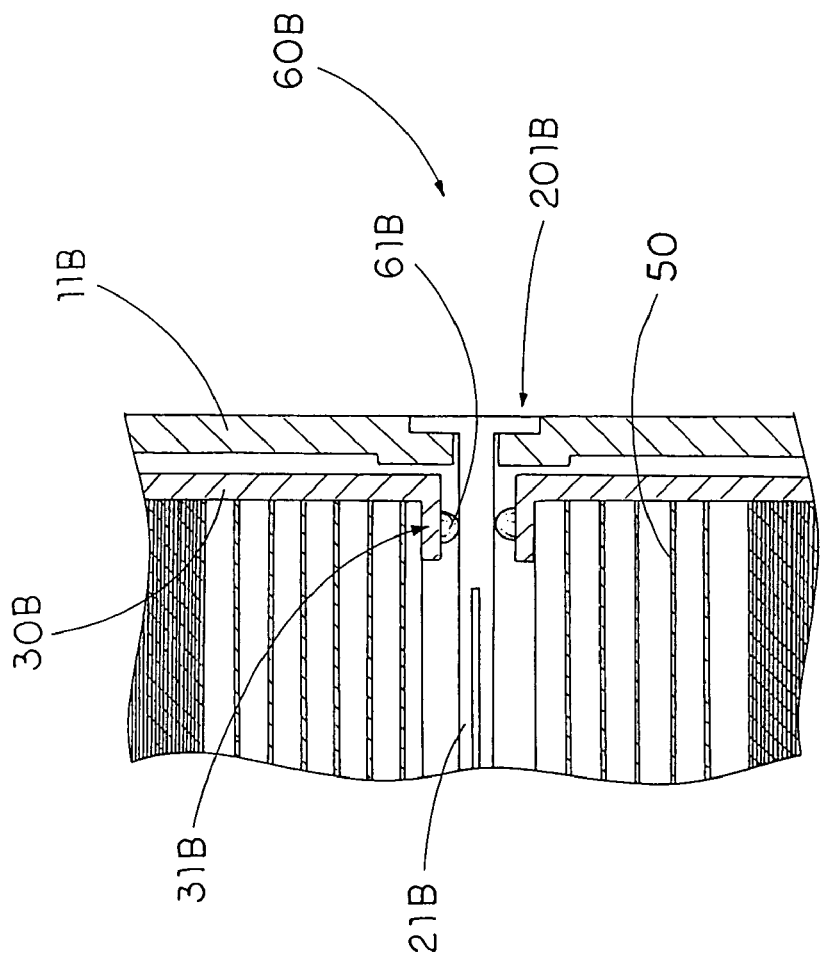
FIG. 5B
FIG. 5A

US 6,994,289 B2

REEL ROTATION MOUNT ARRANGEMENT EQUIPPED WITH FRICTION REDUCTION MEANS FOR TAPE MEASURE

CROSS REFERENCE OF RELATED APPLICATION

This is a divisional application of a non-provisional application, application Ser. No. 10/302,176, now U.S. Pat. No. 6,751,883 filed Nov. 21, 2002.

BACKGROUND OF THE PRESENT INVENTION

1. Field of Invention

The present invention relates to a tape measure, and more particularly to a reel rotation mount arrangement equipped with friction reduction means for tape measure, which is capable of not only substantially supporting a tape reel via a supporting axle but also enhancing the rotational movement of the tape reel by means of the friction reduction device.

2. Description of Related Arts

Retractable tape measures have been commercially used for many years. As shown FIG. 1, a conventional tape measure comprises a housing A1 having an entrance and two opposed sidewalls A11, a reel A2 rotatably mounted in the housing A1, an elongated measuring blade A3 having one end attached to the reel and another stopper end extending out of the housing A1 through the entrance, and a retracting means A4 for winding up the measuring blade A3 in a coil rolled manner in the housing A1 while the stopper end of the measuring blade A3 being blocked at the entrance of housing A1. One of the most distinctive features of the tape measure is that the measuring blade A3 can be pulled out from the housing A1 for measuring purpose and automatically retracted back into the housing A1 via the retracting means A4.

In order to rotatably support the reel A2 in the housing A1, the tape measure further comprises a supporting unit comprising two hollow supporting shafts A5 integrally and inwardly extended from the two sidewalls A11 of the housing A1 respectively to rotatably support the reel A2. Accordingly, since the housing A1 is usually made of plastic to reduce the cost of the tape measure, the plastic made supporting shafts A5 cannot rigidly support the reel A2. Especially when the pulling force and the retracting force from the measuring blade A3 are exerted on the supporting shafts A5, the supporting shafts A5 will be broken easily. Moreover, since both the supporting shafts A5 and the reel A2 are made of plastic, the frictional force between the supporting shaft A5 and the reel A2 will generate heat and wear away the supporting shafts A5, so as to deteriorate the smooth operation of the measuring blade A3.

For reducing the frictional force of the tape measure, a bearing A6 is mounted between the supporting shafts A5 and the reel A2 since the bearing A6 is commonly used as a friction reduction device between the two rotational surfaces to reduce the friction force therebetween. However, there are several drawbacks for the tape measure when the bearing unit A6 is employed therewith.

Since the contacting area between the supporting shafts A5 and the reel A2 is constructed as an outer circumference surface of each supporting shaft A5, the bearing A6 must be radially extended to cover the contacting area in order to enhance the rotational movement of the reel A2. In other words, a bigger interior of the housing A1 is required to fit the bearing A6 therein, so that the size of the housing A1 must be substantially increased, so as to reduce the portability of the tape measure.

In addition, even though the bearing A6 can enhance the smooth in and out sliding movement of the measuring blade A3 with respect to the reel A2, the structure of the bearing A6 will cause a vibration force on the measuring blade A3. It is because two sides of the reel A2 are rotatably supported by the supporting shafts A5 respectively, when the measuring blade A3 is pulled out from or retracted back to the housing A1, an uneven pulling or retracting force is created at two sides of the reel A2. As a result, the sliding operation of the measuring blade A3 is deteriorated by the vibration force.

Moreover, the bearing A6 will not only increase the cost of the tape measure but also complicate the structure of the tape measure so as to increase the manufacturing cost thereof. Therefore, the conventional tap measure cannot provide a rigid structure to support the reel and a smooth sliding operation of the measuring blade A3 while being cost effective.

Another drawback of the conventional tape measure is that the retracting means A4 is easily broken by the in and out movement of the measuring blade A3. When a portion of the measuring blade A3 is pulled out from the housing A1 through the entrance thereof, a retracting force is restored in the retracting means A4 for automatically retracting the measuring blade A3 back into the housing A1 when the pulling force on the measuring blade A3 is released. However, when the measuring blade A3 is pulled outwardly, the weight of the measuring blade A3 will be dropped downwardly and force the measuring blade A3 in contact with the housing A1 at the entrance. Therefore, the retracting means A4 must provide enough retracting force to not only pull back the measuring blade A3 into the housing A1 but also compensate the friction force between the measuring blade A3 and the housing A1. In other words, due to the friction force, the retracting means A4 will be easily worn out after a period of continuous use.

SUMMARY OF THE PRESENT INVENTION

A main object of the present invention is to provide a reel rotation mount arrangement equipped with friction reduction means for tape measure, which is capable of not only substantially supporting a tape reel via a supporting axle but also enhancing and smoothing the rotational movement of the tape reel by means of the friction reduction device.

Another object of the present invention is to provide a reel rotation mount arrangement equipped with friction reduction means for tape measure, which can substantially smoothen the rotational movement of the tape reel and prevent, especially during the retraction of the measuring blade. Therefore, the retraction power of coil spring can be reduced correspondingly and thus the width of the coil spring can be reduced, for example from 30 mm to 22 mm for a 35 feet tape measure, so that the weight, the size and the manufacturing cost of the tape measure can be largely reduced in comparison with the conventional tape measure.

Another object of the present invention is to provide a reel rotation mount arrangement equipped with friction reduction means for tape measure, wherein two ends of the supporting axle are securely mounted to the housing to rigidly support the tape reel in a rotatably movable manner.

Another object of the present invention is to provide a reel rotation mount arrangement equipped with friction reduction means for tape measure, wherein the friction reduction device is mounted between the housing and the reel for enhancing the smooth rotational movement of the tape reel so as to minimize the vibration force of the measuring tape during operation.

Another object of the present invention is to provide a reel rotation mount arrangement equipped with friction reduction means for tape measure, wherein the tape measure does not require altering the original structural design in order to incorporate with the friction reduction device. In other words, the housing can be constructed to have a compact size to enhance the portability of the tape measure. In addition, the conventional tape measure is capable of employing the friction reduction device to enhance the rotational movement of the tape reel.

Another object of the present invention is to provide a reel rotation mount arrangement equipped with friction reduction means for tape measure, wherein no expensive or complicated structure is required to employ in the present invention in order to achieve the above mentioned objects. Therefore, the present invention successfully provides an economic and efficient solution not only for providing a rigid configuration for supporting the tape reel but also for enhancing the rotational movement of the tape reel.

Accordingly, in order to accomplish the above objects, the present invention provides a tape measure, comprising:

a housing assembly comprising a casing having two opposed sidewalls, a receiving cavity forming therebetween and an opening communicating with the receiving cavity, and a reel rotation mount arrangement comprising a supporting axle having two ends supported at the sidewalls of the casing respectively;

a tape reel which is disposed in the receiving cavity of the casing and is rotatably supported by the supporting axle;

an elongated measuring blade, which is disposed in the receiving cavity, having an inner end attached to the tape reel and an outer end being blocked at the opening of the casing and arranged to extend out of the casing through the opening;

a retracting means for winding up the measuring blade in a coil rolled manner about the tape reel; and a friction reduction device provided between the supporting axle and the tape reel for substantially reducing a friction therebetween so as to enhance a rotational movement of the tape reel with respect to the supporting axle.

BRIEF DESCRIPTION OF THE DRAWINGS

FIGS. 4A and 4B illustrate a first alternative mode of the friction reduction device of the tape measure according to the above preferred embodiment of the present invention.

FIGS. 5A and 5B illustrate a second alternative mode of the friction reduction device of the tape measure according to the above preferred embodiment of the present invention.

DETAILED DESCRIPTION OF THE PREFERRED EMBODIMENT

Figure 1:
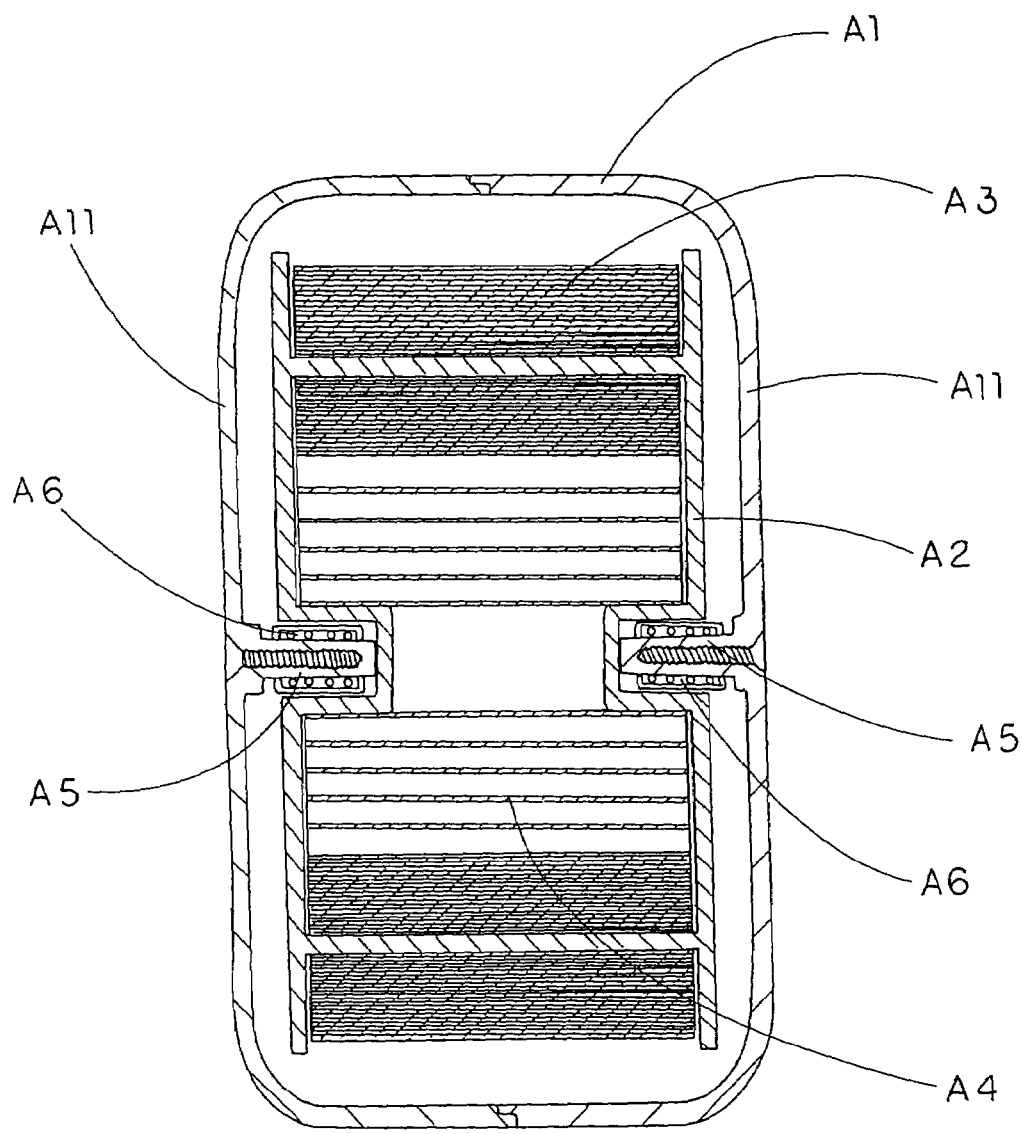
FIG. 1 is a sectional view of a conventional tape measure.
Figure 2:
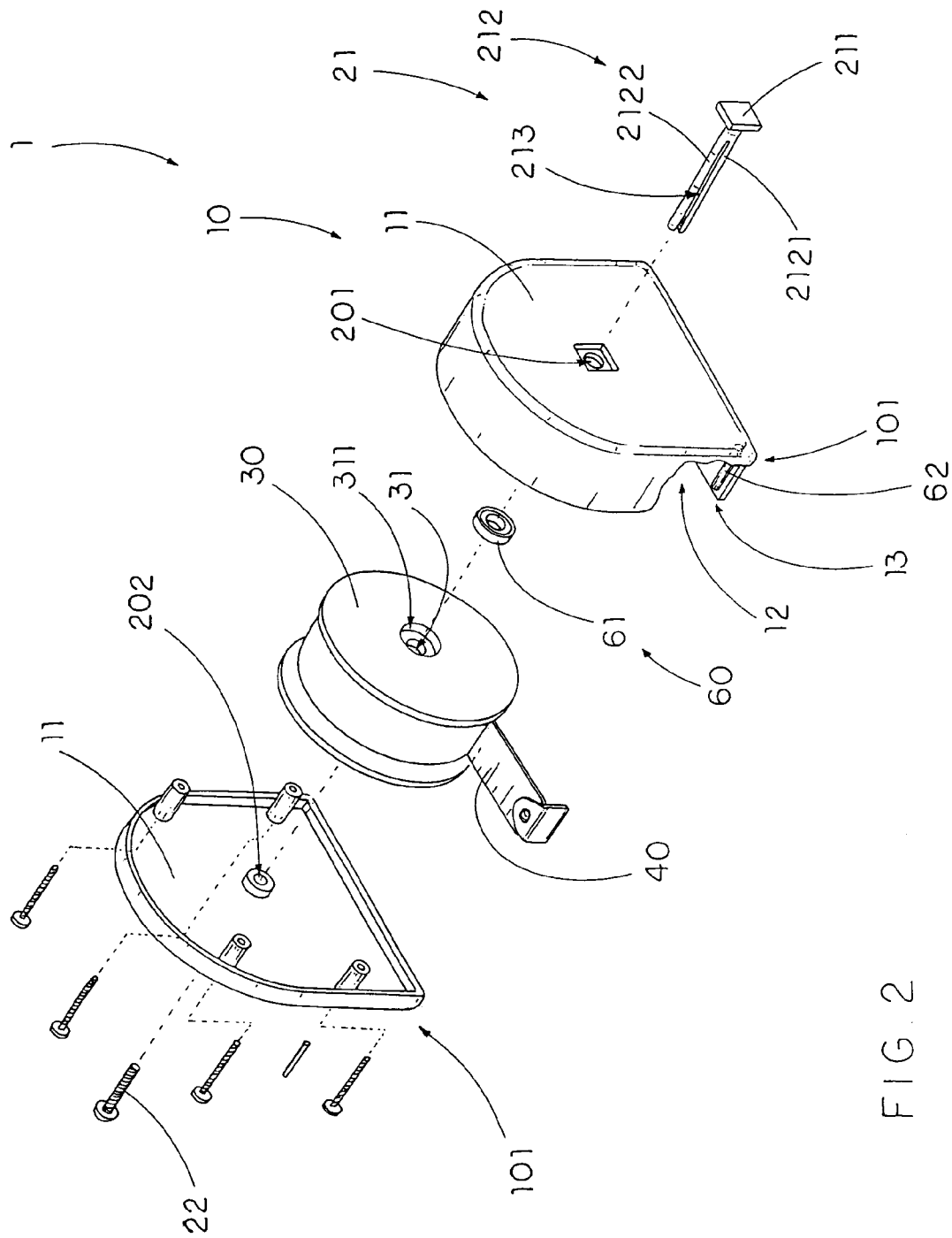
FIG. 2 is an exploded perspective view of a tape measure incorporated with a reel rotation mount arrangement equipped with friction reduction means according to a preferred embodiment of the present invention.
Figure 3:
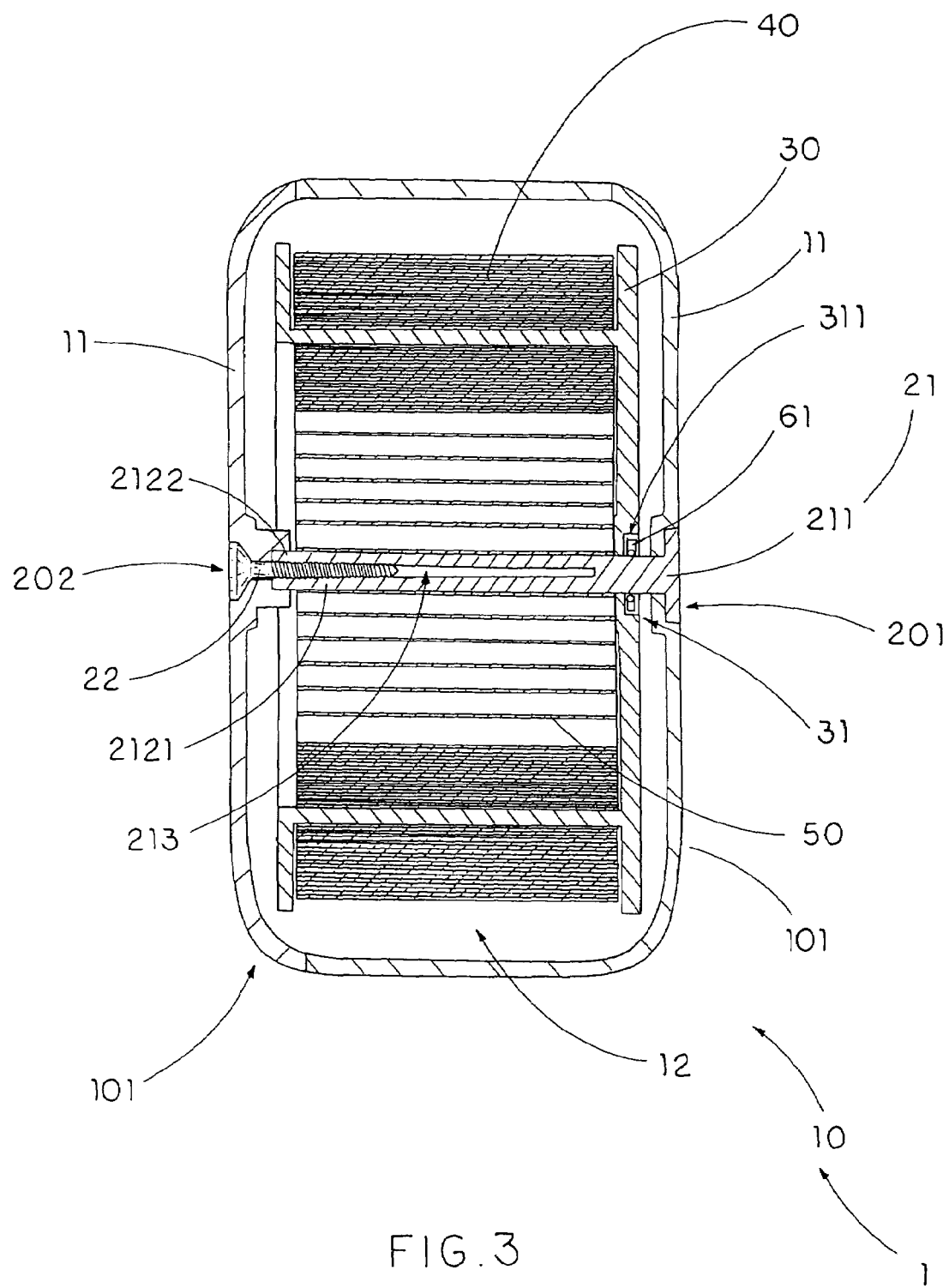
FIG. 3 is a sectional view of the tape measure incorporated with a reel rotation mount arrangement equipped with friction reduction means according to the above preferred embodiment of the present invention.

Referring to FIGS. 2 and 3 of the drawings, a tape measure according to a preferred embodiment of the present invention is illustrated, wherein the tape measure comprises a housing assembly 1 comprising a casing 10 having two opposed sidewalls 11, a receiving cavity 12 forming therebetween, and an opening 13 communicating with the receiving cavity 12, and a reel rotation mount arrangement 20 comprising a supporting axle 21 having two ends supported at the sidewalls 11 of the casing 10 respectively.

The tape measure further comprises a tape reel 30 which is disposed in the receiving cavity 12 of the casing 10 and is rotatably supported by the supporting axle 21, an elongated measuring blade 40, which is disposed in the receiving cavity 12, having an inner end attached to the tape reel 30 and an outer end being blocked at the opening 13 of the casing 10 and arranged to extend out of the casing 10 through the opening 13, and a retracting means 50 such as a coil spring for winding up the measuring blade 40 in a coil-rolled manner about the tape reel 30.

The tape measure further comprises a friction reduction device 60 provided between the supporting axle 21 and the tape reel 30 for substantially reducing a friction therebetween so as to enhance and smoothen a rotational movement of the tape reel 30 with respect to the supporting axle 21.

According to the preferred embodiment, the casing 10 is constructed by two outer case members 101 securely mounted together wherein the sidewalls 11 of the casing 10 are formed at the case members 101 respectively.

The reel rotation mount arrangement 20 further comprises a locking element 22 and has a first through slot 201 formed on one of the sidewalls 11 of the casing 10 and a second through slot 202 formed on another sidewall 11 of the casing 10 wherein the supporting axle 21 is slidably passed through the first and second through slots 201, 202 and securely locked up by the locking element 22 between the sidewalls 11 of the casing 10.

As shown in FIG. 2, the supporting axle 21, which is preferably made of metal, has an enlarged axle head 211, having a non-circular shaped, fittedly engaged with the first through slot 201 having the corresponding non-circular shaped, and an elongated axle body 212 extended from the axle head 211 to slidably pass through the second through slot 202 and locked up by the locking element 22 at an outer side of the respective sidewall 11, so as to securely lock up the two ends of the supporting axle 21 on the sidewalls 11 of the casing 10 respectively.

The axle body 212 comprises two axle arms 2121, 2122 spacedly extended from the axle head 211 towards the second through slot 202 to form a locking slot 213 longitudinally between the two axle arms 2121, 2122, wherein the locking element 22 is arranged to insert into the locking slot 213 so as to lock up the supporting axle 21 between the sidewalls 11 of the casing 10.

It is worth to mention that since the axle head 211 of the supporting axle 21 is constructed to form a non-circular shape, when the axle head 211 is engaged with the first through slot 201 of the respective sidewall 11, the axle head 211 is locked up at the sidewall 11 so as to block up a rotational movement of the supporting axle 21 with respect to the sidewall 11 of the casing 10.

In addition, the first though slot 201 is constructed by forming a circular hole at an inner side of the respective sidewall 11 for the axle body 212 slidably passing through and a non-circular hole at an outer side of the respective sidewall 11 for the axle head engaging therewith.

Moreover, the locking element 22, according to the preferred embodiment, is a screw rotatably inserted into the locking slot 213 of the axle body 212 to slightly force the axle arms 2121, 2122 bending outwardly, so as to bias against the respective sidewall 11 around the second through slot 202. In other words, two ends of the supporting axle 21 are securely locked up at the sidewalls 11 of the casing 10 respectively. In addition, once the ends of the supporting axle 21 are securely attached at the sidewalls 11 of the casing 10 respectively, the case members 101 are locked up together to form the casing 10, so that the configuration of the housing assembly 1 not only provides rigid support for the supporting axle 21 to support the tape reel 30 thereon but also reinforces the attachment of the casing 10 to form the receiving cavity 12.

The tape reel 30, having a U-shaped cross sectional, has a central hub 31 embodied as an axle supporting slot formed on the tape reel 30 at a position aligning with the first and second through slots 201, 202 for the axle body 212 of the supporting axle 21 slidably passing through so as to coaxially and rotatably support the tape reel 30 on the supporting axle 21 within the receiving cavity 12.

The measuring blade 40 is normally winded up by the retracting means 50 and received in the receiving cavity 12 of the casing 10 in a coiled manner about an outer circumferential surface of the tape reel 30 while the outer end of the measuring blade 40 is stopped and positioned at the opening 13 of the casing 10 and adapted to be pulled out at the outer end from the casing 10 through the opening 13.

The retracting means 50, according to the preferred embodiment, is a coil spring formed of a ribbon of metal disposed in the receiving cavity 12 of the casing 10 to rotate the tape reel 30 about the supporting axle 21 wherein the retracting means 50 is adapted for providing a retracting force on the tape reel 30 to wind up the measuring blade 40 when a portion of the measuring blade 40 is pulled out of casing 10.

The friction reduction device 60 comprises a bearing unit 61, which is made of metal, coaxially mounted on the tape reel 30 at a positioned between the central hub 31 and the supporting axle 21 for reducing a friction therebetween. Accordingly, the central hub 31 has a L-shaped mounting edge to define a mounting groove 311 coaxially indented on the tape reel 30 such that the bearing unit 61 is securely engaged with the mounting groove 311 to rotatably contact with the supporting axle 21.

It is worth to mention that when the tape reel 30 is rotated about the supporting axle 21, the contacting area is defined between the central hub 31 and the supporting axle 21. Therefore, the bearing unit 61 is capable of not only enhancing the rotational movement of the tape reel 30 about the supporting axle 21 by reducing the friction therebetween but also reinforcing the central hub 31 of the tape reel 30 so as to prevent the tape reel 30 from being broken by the rotational force.

In addition, due to the contacting area of the central hub 31 with respect to the supporting axle 21, no vibration force is created when the measuring blade 40 is pulled in and out of the casing 10. Moreover, the bearing unit 61 of the friction reduction device 60 is coaxially mounted on the central hub 31 of the tape reel 30, no additional installation space is required in order to employ in the housing assembly 1. Therefore, the casing 10 can be configured to have a compact size for enhancing the portability of the tape measure of the present invention. It is worth to mention that the conventional tape measure is capable of incorporating with the reel rotation mount arrangement 20 with the friction reduction device 60 of the present invention without altering the original structural design so as to minimize the manufacturing cost of the tape measure.

As shown in FIG. 2, the friction reduction device 60 further comprises a blade bearing 62 provided on the casing 10 at the opening 13 thereof for reducing a friction between the casing 10 and the measuring blade 40 during an in and out movement of the measuring blade 40 with respect to the casing 10.

The blade bearing 62 is upwardly extended from the casing 10 within the receiving cavity 12 wherein the blade bearing 62 functions as a pivot point to support the measuring blade 40 at a bottom side thereof so as to reduce a contact area between the casing 10 and the measuring blade 40. Accordingly, the blade bearing 62 can be a ball bearing, a metal pin having a round surface for minimizing the contact area between the blade bearing 62 and the bottom side of the measuring blade 40, so as to enhance the in and out movement of the measuring blade 40 with respect to the casing 10. In other words, the retracting means 50 does not have to provide an additional retracting force to overcome the friction of the measuring blade 40 in order to retract the measuring blade 40 back into the receiving cavity 12 of the casing 10 so as to prolong the service span of the retracting means 50.

FIGS. 4 and 5 of the drawings illustrate alternative modes of the friction reduction device 60 which is provided between the casing 10 and the tape reel 30 for reducing a friction therebetween so as to enhance the rotational movement of the tap reel 30 within the receiving cavity 12.

As shown in FIGS. 4A and 4B, the central hub 31A is embodied as an axle supporting slot formed on the tape reel 30A aligning with the first through slot 201A on the respective sidewall 11A for the supporting axle 21A slidably passing through. The friction reduction device 60A has a plurality of bearing protrusions 61A spacedly and radially protruded on a circumferential edge of the axle supporting slot of the central hub 31A for radially contacting with the supporting axle 21A and for minimizing a contacting area between the tape reel 30A and the supporting axle 21A so as to enhance the rotational movement of the tape reel 30A with respect to the supporting axle 21A.

As shown in FIGS. 5A and 5B, the central hub 31B, having a tubular shaped, integrally and inwardly extended from the tape reel 30B at a position aligning with the first through slot 201B on the respective sidewall 11B for the supporting axle 21B slidably passing through wherein the friction reduction device 60B has a plurality of bearing protrusions 61B spacedly and radially protruded on an inner circumferential side of the central hub 31B for radially contacting with the supporting axle 21B so as to minimize a contacting area between the tape reel 30B and the supporting axle 21B for enhancing the rotational movement of the tape reel 30B with respect to the supporting axle 21B.

Figure 6B:
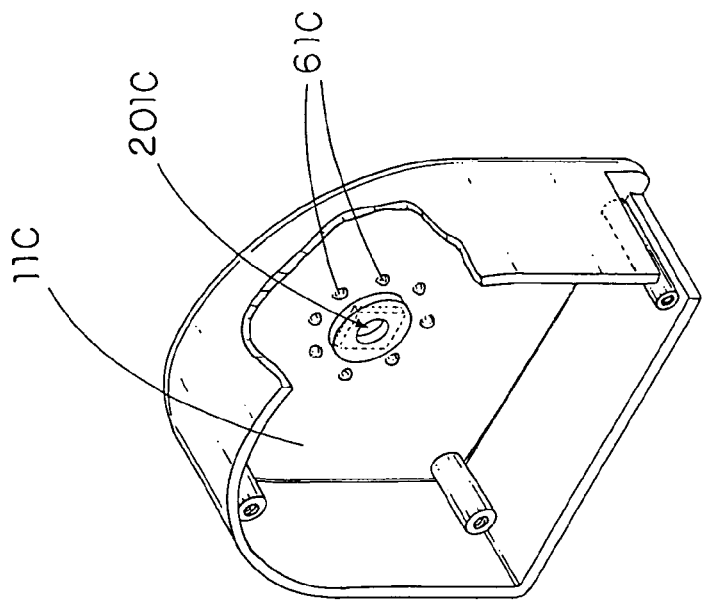
FIGS. 6A and 6B illustrate a third alternative mode of the friction reduction device of the tape measure according to the above preferred embodiment of the present invention.
Figure 6A:
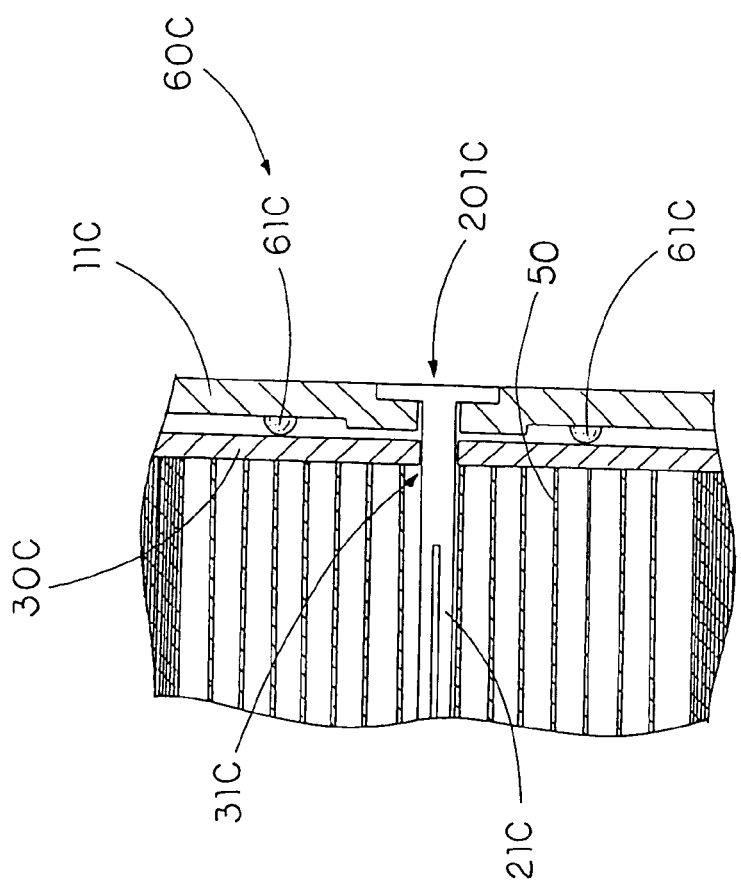

As shown in FIGS. 6A and 6B, the central hub 31C is embodied as an axle supporting slot formed on the tape reel 30C aligning with the first through slot 201C on the respective sidewall 11C for the supporting axle 21C slidably passing through. The friction reduction device 60C comprises a plurality of bearing protrusions 61C spacedly and radially protruded on an inner side of the respective sidewall 11A of the casing 10A around the first through slot 201A to contact with the tape reel 30C so as to minimize a contacting area between the tape reel 30C and the sidewall 11C of the casing 10C for enhancing the rotational movement of the tape reel 30C with respect to the housing assembly 1C.

In view of above, the reel rotation mount arrangement equipped with friction reduction means for tape measure according to the present invention substantially achieves the following distinctive features:

(1) It is capable of not only substantially supporting a tape reel via a supporting axle but also enhancing and smoothing the rotational movement of the tape reel by means of the friction reduction device.

(2) The reel rotation mount arrangement which is equipped with friction reduction means for tape measure can substantially smoothen the rotational movement of the tape reel and prevent, especially during the retraction of the measuring blade. Therefore, the retraction power of coil spring can be reduced correspondingly and thus the width of the coil spring can be reduced, for example from 30 mm to 22 mm for a 35 feet tape measure, so that the weight, the size and the manufacturing cost of the tape measure can be largely reduced in comparison with the conventional tape measure.

(3) Two ends of the supporting axle are securely mounted to the housing to rigidly support the tape reel in a rotatably movable manner.

(4) The friction reduction device is mounted between the housing and the reel for enhancing the smooth rotational movement of the tape reel so as to minimize the vibration force of the measuring tape during operation.

(5) The tape measure does not require to alter the original structural design in order to incorporate with the friction reduction device. In other words, the housing can be constructed to have a compact size to enhance the portability of the tape measure. In addition, the conventional tape measure is capable of employing the friction reduction device to enhance the rotational movement of the tape reel.

(6) No expensive or complicated structure is required to employ in the present invention in order to achieve the above mentioned objects. Therefore, the present invention successfully provides an economic and efficient solution not only for providing a rigid configuration for supporting the tape reel but also for enhancing and smoothening the rotational movement of the tape reel.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A tape measure, comprising:
a housing assembly including:
a casing having two opposed sidewalls, a receiving cavity forming therebetween and an opening communicating with said receiving cavity, and
a reel rotation mount arrangement comprising a supporting axle which is disposed in said receiving cavity and is extended between said sidewalls of said casing and a locking element locking up said supporting axle at said respective sidewall so as to securely retain said supporting axle between said sidewalls in a non-rotation manner;
a tape reel which is disposed in said receiving cavity of said casing and is rotatably supported by said supporting axle;
an elongated measuring blade, which is disposed in said receiving cavity, having an inner end attached to said tape reel and an outer end being blocked at said opening of said casing and arranged to extend out of said housing through said opening;
a retracting means for winding up said measuring blade in a coil rolled manner about said tape reel; and
a friction reduction device provided between said supporting axle and said tape reel for substantially reducing a friction therebetween so as to enhance a rotational movement of said tape reel with respect to said supporting axle, wherein said reel rotation mount arrangement further has a first through slot formed at one of said sidewalls of said casing and a second through slot formed on another said sidewall to concentrically align with said first through slot, wherein said supporting axle is slidably passed through said first and second through slots and securely locked up by said locking element between said sidewalls of said casing, wherein said supporting axle has an axle head engaged with said first through slot arranged to lock up a rotational movement of said supporting axle with respect to said casing and an axle body extended from said axle head to slidably pass through said second through slot and locked up said locking element at an outer side of said respective sidewall, so as to securely lock up said two ends of said supporting axle on said sidewalls of said casing respectively, wherein said supporting axle further comprises two axle arms spacedly extended from said axle head towards said second through slot to form a locking slot longitudinally between said two axle arms, wherein said locking element is rotatably inserted into said locking slot of said axle body to slightly force said axle arms bending outwardly, so as to bias against said respective sidewall around said second through slot.

2. A tape measure, comprising:
a housing assembly comprising:
a casing having two opposed sidewalls, a receiving cavity forming therebetween and an opening communicating with said receiving cavity, and
a reel rotation mount arrangement comprising a supporting axle which is disposed in said receiving cavity and is extended between said sidewalls of said casing and a locking element locking up said supporting axle at said respective sidewall so as to securely retain said supporting axle between said sidewalls in a non-rotation manner;
a tape reel which is disposed in said receiving cavity of said casing and is rotatably supported by said supporting axle;
an elongated measuring blade, which is disposed in said receiving cavity, having an inner end attached to said tape reel and an outer end being blocked at said opening of said casing and arranged to extend out of said housing through said opening;
a retracting means for winding up said measuring blade in a coil rolled manner about said tape reel; and
a friction reduction device provided between said casing and said tape reel for substantially reducing a friction therebetween so as to enhance a rotational movement of said tape reel within said receiving cavity, wherein said reel rotation mount arrangement further has a first through slot formed at one of said sidewalls of said casing and a second through slot formed on another said sidewall to concentrically align with said first through slot, wherein said supporting axle is slidably passed through said first and second through slots and securely locked up by said locking element between said sidewalls of said casing, wherein said supporting axle has an enlarged axle head arranged to lock up a rotational movement of said supporting axle with respect to said casing, and an elongated axle body extended from said axle head to slidably pass through said second through slot and locked up by said locking element at an outer side of said respective sidewall, so as to securely lock up said two ends of said supporting axle on said sidewalls of said casing respectively, wherein said axle body comprises two axle arms spacedly extended from said axle head towards said second through slot to form a locking slot longitudinally between said two axle arms, wherein said locking element is rotatably inserted into said locking slot of said axle body to slightly force said axle arms bending outwardly, so as to bias against said respective sidewall around said second through slot.

3. The tape measure, as recited in claim 2, wherein said friction reduction device further comprises a blade bearing provided on said casing at said opening thereof for reducing a friction between said casing and said measuring blade during an in and out movement of said measuring blade with respect to said casing.

* * * * *